Figures 1, 2:
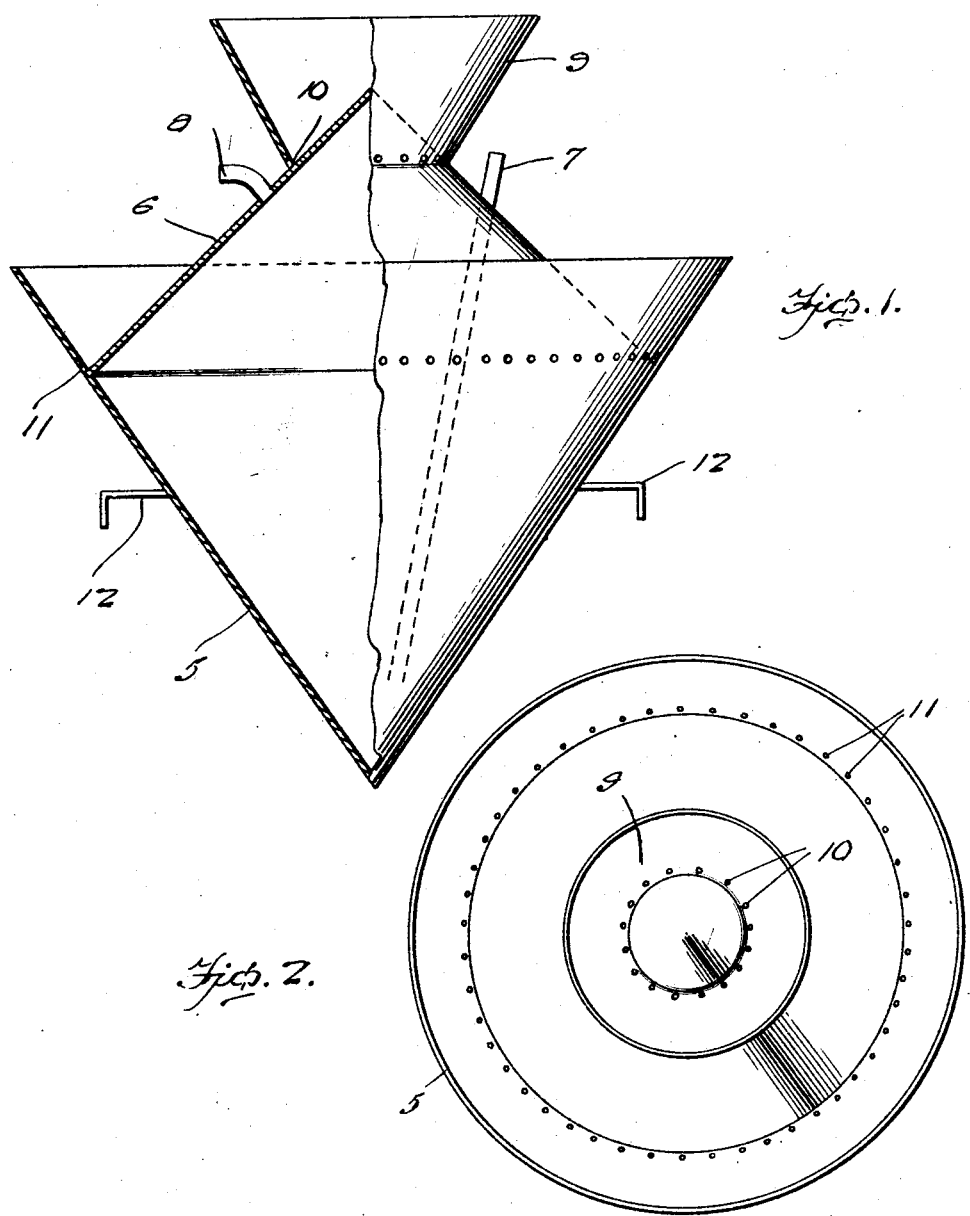

Nov. 22, 1927.

E. J. COLIN 1,650,326

MILK AND CREAM COOLING DEVICE

Original Filed May 14, 1926

Inventor

E. J. Colin

By Clarence A. O'Brien

Attorney

Patented Nov. 22, 1927.

1,650,326

UNITED STATES PATENT OFFICE.

ERICK J. COLIN, OF BOCK, MINNESOTA.

MILK AND CREAM COOLING DEVICE.

Application filed May 14, 1926, Serial No. 109,107. Renewed October 4, 1927.

This invention relates to devices for facilitating the cooling of milk and cream and particularly cream as the same is discharged from a separator prior to the passage of the same into a shipping can.

The invention aims to provide a cooling device of the aforementioned character that is extremely simple of construction and inexpensive of operation, and of such a nature as to permit the positioning of the same upon a shipping can to permit the cooling of the material simultaneously with the passage of the same into the can.

In the drawing wherein like reference characters indicate corresponding parts in both of the views:

Figure 1 is a view partly in side elevation and partly in cross section of a cooling device constructed in accordance with the present invention, and Figure 2 is a top plan view thereof.

Now having particular reference to the drawing, my novel cooling device, constitutes the provision of an inverted conical metallic body 5 within the upper end of which is formed a metallic cone 6 of smaller dimension than the cone 5, said cones combining to provide a receptacle for the cooling medium which in this instance is water. Leading into the receptacle is a water inlet pipe 7 while leading therefrom is a discharge pipe 8 to which should be associated flexible pipes leading from a source of water supply and to a point of water discharge respectively.

Arranged upon the apex of the cone 6 is an inverted frusto conical hopper 9 formed with openings 10 at its point of association with the cone 6 to permit the fluid being cooled to pass therefrom and to trickle over the surface of the cone 6 to be cooled. The enlarged end portion of the conical body 5 and the cone 6 form a trough within which the milk or cream will be trapped after passing over the cone 6. Directly above the cone 6 the cone 5 is also formed with discharge openings 11 to permit the material to flow from the trough and to run down the cone 5 to be additionally cooled.

The cone 5 is provided with suitable bracket arms 12 to permit the support of the same within a shipping can, and it will thus be seen that I have provided a highly novel, simple, and efficient form of cooling device that is well adapted for all the purposes heretofore designated and even though I have herein shown and described a particular embodiment of the invention, it is nevertheless to be understood that minor changes may be made therein without effecting the spirit and scope of the appended claim.

Having thus described the invention, what I claim as new and desire to secure by Letters Patent is:—

In a cooling device of the class described, a container for a cooling medium comprising a relatively large inverted cone, and a relatively small cone, the larger portion of the smaller cone being arranged within the open end of the inverted larger cone whereby a trough is provided around the container, inlet and outlet pipes for the cooling medium associated with the container, a feed hopper for the material to be cooled, said feed hopper comprising an inverted frusto-conical member surrounding the apex of the smaller cone, said frusto-conical feed hopper having a series of circumferentially arranged discharge openings formed therein at a point adjacent the lower edge of the frusto-conical hopper so that the material which is to be cooled will flow downwardly against the outer surface of the smaller cone, the inverted larger cone being provided with a series of circumferentially extending discharge openings at a point adjacent the bottom of said trough whereby the material will trickle downwardly over the outer surface of the inverted larger cone.

In testimony whereof I affix my signature.

ERICK J. COLIN.